(12) United States Patent
Herbstritt

(10) Patent No.: US 8,696,193 B2
(45) Date of Patent: Apr. 15, 2014

(54) COAXIAL COMPACT STATIC MIXER AND USE THEREOF

(75) Inventor: Frank Herbstritt, Alzey (DE)

(73) Assignee: Ehrfeld Mikrotechnik BTS GmbH, Wendelsheim (DE)

( * ) Notice: Subject to any disclaimer, the term of this patent is extended or adjusted under 35 U.S.C. 154(b) by 27 days.

(21) Appl. No.: 13/201,349

(22) PCT Filed: Feb. 23, 2010

(86) PCT No.: PCT/EP2010/001104
§ 371 (c)(1),
(2), (4) Date: Oct. 27, 2011

(87) PCT Pub. No.: WO2010/099884
PCT Pub. Date: Sep. 10, 2010

(65) Prior Publication Data
US 2012/0033524 A1 Feb. 9, 2012

(30) Foreign Application Priority Data
Mar. 6, 2009 (DE) .......................... 10 2009 011 996

(51) Int. Cl.
*B01F 5/06* (2006.01)

(52) U.S. Cl.
USPC ........................................................ 366/338

(58) Field of Classification Search
USPC .................... 366/336, 176.1, 134, 153.2, 145
See application file for complete search history.

(56) References Cited

U.S. PATENT DOCUMENTS

| | | | | |
|---|---|---|---|---|
| 1,637,697 A * | 8/1927 | Jacobsen | | 366/336 |
| 2,531,547 A | 11/1950 | Ayres | | |
| 3,051,452 A | 8/1962 | Leendert Nobel | | |
| 3,923,288 A * | 12/1975 | King | | 366/336 |
| 4,198,168 A * | 4/1980 | Penn | | 366/336 |
| 4,541,982 A | 9/1985 | Upmeier | | |
| 4,848,920 A * | 7/1989 | Heathe et al. | | 366/339 |
| 5,454,640 A * | 10/1995 | Welker | | 366/336 |
| 5,564,827 A | 10/1996 | Singer | | |
| 5,904,424 A | 5/1999 | Schwesinger et al. | | |
| 6,399,031 B1 * | 6/2002 | Herrmann et al. | | 366/336 |
| 6,457,854 B1 | 10/2002 | Koop et al. | | |
| 6,982,064 B1 | 1/2006 | Ehrfeld et al. | | |
| 7,034,067 B1 | 4/2006 | Klinksiek et al. | | |
| 7,507,387 B2 * | 3/2009 | Mae et al. | | 366/341 |
| 7,909,502 B2 | 3/2011 | Ehrfeld et al. | | |
| 2005/0047274 A1 * | 3/2005 | Moser et al. | | 366/336 |
| 2005/0189092 A1 | 9/2005 | Jahn et al. | | |
| 2007/0257378 A1 | 11/2007 | Spiegel | | |

FOREIGN PATENT DOCUMENTS

| | | |
|---|---|---|
| DE | 14 07 515 A1 | 9/1969 |
| EP | 0 113 041 A1 | 7/1984 |
| EP | 1 203 036 B1 | 5/2002 |

(Continued)

OTHER PUBLICATIONS

Hessel/Hardt/Löwe, "Chemical Micro Process Engineering", Wiley-VCH, Weinheim "Caterpillar Mini Mixer", p. 401 (2004).

(Continued)

*Primary Examiner* — Tony G Soohoo
*Assistant Examiner* — Anshu Bhatia
(74) *Attorney, Agent, or Firm* — Norris McLaughlin & Marcus PA

(57) ABSTRACT

Scalable compact static mixer comprising a rotationally symmetrical cascaded mixing structure.

15 Claims, 7 Drawing Sheets

(56) References Cited

FOREIGN PATENT DOCUMENTS

| | | |
|---|---|---|
| EP | 1 486 749 A2 | 12/2004 |
| EP | 1 718 403 B1 | 5/2011 |
| GB | 900 656 A | 7/1962 |
| GB | 941 893 A | 11/1963 |
| WO | 95/09689 A1 | 4/1995 |
| WO | 97/13075 | 4/1997 |
| WO | 00/76648 | 12/2000 |
| WO | 2004/007063 A1 | 1/2004 |
| WO | 2004/052518 A3 | 6/2004 |

OTHER PUBLICATIONS

Kenics KM Static Mixer Bulletin-800, p. 1-12, from Chemineer, Inc., p. 1-12, (2009).

Perry's Chemical Engineer's Handbook, 7th edition, McGraw Hill, New York (1997)).

International Search Report dated Jun. 10, 2010.

Miprowa Ehrfeld Mikrotechnik BTS Gmbh; Hochdurchsatz Reaktoren und Wärmetauscher.

IMM "Caterpillar Mini Mixer" Auszug aus dem Katalog IMM; Caterpillar Mikromixer CPMM-V 1.2 Group Class R 150, -R 300, -R 600, -R 1200, -R 2400 (this is an extract from the catalogue); http://www.imm-mainz.def/fileadmin/IMM-upload/Flyer-Katalog_etc/Catalogue09_Caterpillar.pdf.

Kenics KM Static Mixer, Kenics Bulletin Published 2011 by Chemineer, Inc. ; Chemineer, Kenics, Greerco, Prochem, Thermogenizer and CEDS are registered Trademarks of Chemineer, Inc. ; Chemineer, Inc. is a part of the Fluid Management Group of Ribbons & Myers, Inc.

Suzler SMX Mischer, Sulzer Chemtech; Mixing and Reaction Technology Sulzer Chemtech; Sulzer Chemtech AG, P. P. Box 65, CH-8404 Winterthur, Switzerland; Published in 2009, http://www.sulzerchemtech.com/de/desktopdefault.aspx/tabid-571/.

Kenics: Hig Efficiency Static Mixer, Chemineer Inc., Bulletin 811; http://www.chemineer.com/Literature.php.

\* cited by examiner

COAXIAL COMPACT STATIC MIXER AND USE THEREOF

This is a 371 of PCT/EP2010/001104 filed 23 Feb. 2010 (international filing date), claiming priority of German application 10 2009 011 996.5 filed 6 Mar. 2009.

The invention relates to a highly efficient and scalable compact static mixer comprising a rotationally symmetrical cascaded mixing structure and to the use thereof.

BACKGROND OF THE INVENTION

Static mixers generally serve for mixing or dispersing fluidic media in continuous flow. They are characterized in that they do not contain any movable parts—the energy required for the mixing is taken exclusively from the motion or the pressure gradient of the flow flowing through the mixer. The medium or media to be mixed thereby first enter(s) the mixer continuously, either separately in parallel or in a more or less defined pre-mixed or laminated form. Within the mixer, the mixing of the components of the mixture then takes place by single or multiple division, displacement and recombination of the stream of mixture.

Single-stage static mixers may be understood, for example, as including all kinds of mixing and dispersing nozzles or orifice plates (for example those according to U.S. Pat. No. 2,531,547 or EP 1203036 B1) with which a medium is introduced, usually at high pressure and high velocity, into a second medium and is finely distributed therein by breaking down of the jet and/or by turbulence. Furthermore, all kinds of multi-lamination mixers—usually micro-mixers—(for example those according to WO 00/76648, EP 1718403 B1 or WO 2004/052518 A3) with which the mixing of the incoming streams takes place by dividing them once into a multitude of partial streams and subsequently bringing them together in alternating arrangement may be classified as single-stage static mixers.

In the narrower sense, however, those mixers with which the active mixing of the process medium or the process media takes place in a number of steps or successively over a certain mixing section by more or less specifically induced turbulent and/or laminar crossflows (turbulence/advection), which bring about repeated dividing, shearing and/or folding of the flow, are referred to as static mixers. These crossflows are brought about or promoted by deflections, divisions and/or internal components being introduced in a defined manner in the fluid channel acting as the mixing section. The various types of static mixers of this kind differ substantially in the nature and form of the deflections, divisions or internal components in the mixing section. Thus, there are known systems which substantially consist of a tube with orifice plates or nozzles arranged therein periodically one behind the other (for example FIGS. 18-31 in Perry's Chemical Engineer's Handbook, 7th edition, McGraw Hill, New York (1997)). Very widely used, in particular, are tubular systems with interruptedly spiral inserts (for example "Keenics KM Static Mixer" from Chemineer, Inc.), lamellae crossing over alternately in the direction of flow (for example Sulzer SMX, WO 2004/007063 A1, WO 1995/009689 A1 or EP 1486749 A2) or corrugated sheet-like structural elements (for example Sulzer SMV). In particular in the last-mentioned two classes of static mixers, the mixing elements often bring about not only a sequential but also a multiply parallel division, displacement and recombination of the process stream.

For process engineering reasons (for example pressure loss, susceptibility to fouling) and for production engineering reasons (fineness of the mixing structures), decreasing pipe cross sections are usually accompanied by a reduction in the number of parallel flow divisions, so that, at the latest when partial channel dimensions significantly below one millimeter ("micro-mixers") per mixing stage are reached, usually only one division of the media stream into two partial streams is performed, and these streams are then brought together again in a displaced or offset manner (for example U.S. Pat. No. 5,904,424, WO 97/13075 and U.S. Pat. No. 6,457,854 B1 as well as in Hessel/Hardt/Löwe, "Chemical Micro Process Engineering", Wiley-VCH, Weinheim (2004), page 401 "Caterpillar Mini Mixer"—referred to hereafter as a "cascade mixer").

Static mixers are distinguished in comparison with dynamically operating agitators by their very simple and compact construction (no movable parts; usually simple integration in the pipework of an installation). In comparison with discontinuously operating mixers ("agitated tanks"), they also sometimes offer significant additional advantages by their small process volume (short dwell time) and faster and more energy-efficient mixing. The intensive crossmixing (rapid fluid exchange between wall and core regions), the compact flow cross section and a large surface-volume ratio of the mixing section mean that static mixers also often offer much more favorable conditions for the heat exchange of the mixture with the mixing walls than other mixing systems, whereby they are also particularly well-suited for mixing tasks with simultaneous temperature control of the mixture, purely temperature-control tasks or as continuously operating reactors with permanent intermixing, and consequently a narrow dwell time range, for example for carrying out exothermal or endothermal (chemical) reactions.

These advantages are intensified in many cases by reduction of the characteristic dimensions (for example channel/mixing structure dimensions) of the mixing section. As a result, diffusion paths for the mass transfer and heat exchange are reduced, and consequently mixing and heat-exchanging processes are sometimes greatly accelerated. In narrow channel structures, furthermore, there are also laminar, and consequently very defined, flow conditions over a very wide range of flow rates, which allow particularly uniform and specific mixture formation with minimized energy input. Usual characteristic lateral mixing structure dimensions of corresponding mini and micro static mixers lie in the range of a few tenths of a millimeter to about 1.5 mm and the overall cross section of a single mixing channel is usually restricted to values of about 10 $mm^2$ to below 1 $mm^2$ Accordingly, the possible throughput of such a mini or micro static mixer with a given feed pressure on the input side is significantly limited. Thus, usual mass flows that are mixed in such mixers rarely exceed values of several 10 kg/h, and consequenty, for most applications, at best cover the product throughput on a laboratory and pilot-plant scale.

In order to realize higher media throughputs, without losing the specific advantages of a mini or micro static mixer (possibly optimized on a laboratory scale), it is obvious practice to connect a number of identical mixing structures (channels) in parallel. Since the mixing in each individual one of these mixing structures proceeds separately as far as the material is concerned from that in the other mixing structures, it is in this case necessary to feed the components to be mixed in at the input of each of the individual parallel mixing structures with the same quantitative ratio (mass flow ratio). Owing to the production- and process-related variations in pressure loss between the individual mixing structures, sufficiently good even distribution of the media streams almost always involves additional technical expenditure. Thus, in the simplest case, throttling orifice plates or channel structures with a very precisely defined pressure drop are introduced, for example, as additional elements into the fluid distribution system upstream of the mixing structures; in more demanding cases, it may even be necessary to provide each mixing structure with an individual mass flow controller. In any case, these additional elements not only cause increased costs but also often a not inconsiderable additional pressure loss and increase the susceptibility of the mixer system to blockages and other possible causes of malfunctions.

Particularly in the case of mini and micro static mixtures, not only the quantitative flow ratio but also the flow pattern at the input of the individual mixing structure may have a significant influence on the mixing result. For example, when a laminar flow of two starting media is fed into a cascade mixer, a good mixing result is only achieved by the end of the mixing section if the initial separating plane between the two starting media lies to the greatest extent perpendicular to the first dividing plane in the mixer. With the parallel connection of a number of identical mixing structures, allowance may likewise be made for this circumstance.

Against the background of this problem, there is therefore the object of describing a static mixer which, on the basis of simple principles and with little technical expenditure, can be scaled over a wide quantitative flow range, without varying the characteristic dimensions of its mixing structures and without requiring elements that cause additional pressure loss. The object is surprisingly achieved by the static mixer described below.

The subject matter of the invention is therefore a static mixer, comprising a coaxial arrangement of a number of mixing stages flowed through sequentially by the fluidic material to be mixed, each individual one of which containing a, possibly azimuthally segmented, annular channel, which in each case goes over into an even number of partial channels of approximately the same size, which along the direction of flow initially go through an alternating radial offset until neighboring partial channels no longer radially overlap, then are drawn out by azimuthal displacement and/or widening into radially interleaved, possibly azimuthally segmented, annular channels, which finally run together again at the end of the respective mixing stage, by radial fusion, to a, possibly azimuthally segmented, annular channel (see FIGS. 2 and 3).

For the purposes of the invention, fluidic media (the material to be mixed) is understood as meaning homogeneous liquids and gases (also solutions and substances in the supercritical phase) as well as flowable (possibly also pseudoplastic) multiphase mixtures, for example suspensions, emulsions, gas-liquid mixtures in any mixing ratio and every possible form of flow.

DETAILED DESCRIPTION

The mutual azimuthal displacement of the partial channels within the mixing stages achieves the effect that a mass transfer takes place between respectively neighboring channels. As a result, each partial channel communicates over an increasing number of mixing stages with an increasing number of neighbors of higher order, whereby fluctuations in the mixing ratio that are possibly present at the inlet to the first mixing stage along the circumference are successively balanced out. Even local disturbances, such as are caused, for example, by deposits or blockages in individual partial channels, have, as a result of this, far less effect on the pressure drop and the mixing result than would be the case with parallel orientation of separate mixing channels. The annular arrangement of the partial channels along the mixing section in this case ensures that there are no peripheral zones in which the transversal flow of material would be interrupted. It also promotes a very compact and pressure-stable type of construction of the mixer in a cylindrical tube shell. After passing through a number of mixing stages, which corresponds approximately to half the number of partial channels per mixing stage, every partial channel has undergone direct or indirect mass transfer with every other. A particularly good equalization of initial azimuthal variations in the mixing ratio is consequently achieved when the number of mixing stages corresponds to at least half the number of partial channels within the (first) mixing stages.

SUMMARY OF THE INVENTION

The annular channel at the input and output of each mixing stage may be configured in the azimuthal direction both as continuous and also as subdivided (segmented) from the outset into partial channels. In the case of a segmented configuration, the partial channels lie around a common axis, at least in an annular arrangement, in the sense that the center points of their cross sections in at least one cross-sectional plane of each mixing stage lie approximately on a circle. The channel delimitations by which the subdivision is brought about are in this case preferably much narrower (by at least a factor of 0.5) in the azimuthal direction than the partial channels themselves. In the case of a segmented configuration, it is generally advantageous if, at the transition from one mixing stage into the one following thereafter, the partial channels are continued without any offset or steps, whereby, in particular, the number of channel segments in successive mixing stages should be the same.

The radial offset, alternating in the azimuthal direction, of the partial channels within the mixing stages may be realized exclusively by orienting every second partial channel toward the axis of the mixer or away from it as well as by simultaneous (alternating) variation of the radial offset of neighboring partial channels. At the end of the offsetting path, however, the inner delimiting area of the further outwardly lying partial channels must be at a distance from the axis of the mixer that is at least as great or greater than the distance of the outer delimiting area of the further inwardly lying partial channels from the axis.

The transition of the partial channels, distributed within a mixing stage alternately on two radial planes by alternating radial offset, to two concentric annular channels, possibly segmented azimuthally right through to the end of the mixing stage, takes place by azimuthal widening of the partial channels along the flow path, which may be preceded or made to coincide with an azimuthal offset of the partial channels— preferably in opposite senses between the two planes. The azimuthal widening of the partial channels is in this case preferably made to coincide with a simultaneous radial narrowing. Particularly preferably, this simultaneous changing of the azimuthal and radial extent of the partial channels is used to keep their cross section at least approximately constant along the flow path.

By contrast with the continuity of the segmentation or number of channels and of the channel cross section over the various mixing stages that is generally considered to be advantageous, in certain cases, in particular if the viscosity of the mixture decreases significantly in the course of the mixing (at least in comparison with its starting components), it may also be advantageous to increase the number of parallel channels from one mixing stage to the one following thereafter, and in parallel with this reduce the dimensions of the channels. In this case, it appears to be particularly advantageous to insert an unsegmented piece of annular channel into the mixing section between the successive mixing stages with different numbers of channels, or to increase the number of channels in the downstream stage of the two mixing stages in comparison with the upstream stage by an integral multiple, so that each channel or each channel segment from the upstream mixing stage is adjoined by a respectively identical number and arrangement of downstream channels or segments.

On the basis of fluidic considerations, it appears to be advantageous to choose the transversal dimensions of the partial channels in a ratio of less than 5, particularly preferably less than 2, to one another and to design the length of an individual mixing stage such that, measured in the main direction of flow of the mixture (this generally corresponds to the axial direction of the mixing section), it preferably corresponds to two to ten times, particularly preferably three to six times, the greatest radial extent of the partial channels.

The absolute dimensions of the partial channels and the number thereof within a mixing stage should preferably be based on the mixing task, in particular on the throughput of mixture, the viscosity of the mixture, possibly the size and amount of solid constituents present in the mixture and possibly a predetermined dwell time of the mixture in the mixer, in each case with consideration for the permissible pressure loss over the mixing section. In the case of a temperature-controlled configuration of the mixer, the required heat exchanging performance may also be a criterion for the design. If, for example, particularly intensive mixing of low-viscosity components is intended to be achieved in as short a time as possible, it is generally advantageous to choose partial channels that are as small as possible and to adapt the parallel number thereof within the mixing stages to the desired throughput of mixture and pressure drop. The number of mixing stages may in this case be kept relatively small on account of the good homogeneity of the mixture that is already achieved in the first mixing stages, while the number should preferably not be less than the number of parallel partial channels within the mixing stages by any more than a factor of about 0.3, in order to ensure a sufficient tolerance of the mixer with respect to incorrect distributions in the mixing ratio and disturbances within the mixing section. In particular when going over to high throughputs of mixture or high viscosities or when using or producing particulate mixtures, an increase in the transversal dimensions may be required—possibly in addition to the increase in the number of parallel partial channels. The accompanying reduction in the mixing quality achieved in comparison with a mixer with smaller channel dimensions can be compensated within certain limits by the increase in the number of mixing stages. Both measures lead of course—especially in combination—to an increase in the fluid volume of the mixing section, and consequently to an increase in the dwell time of the mixture therein. The mixing rate is consequently reduced as a result of this. On the basis of these considerations, advisable transversal partial channel dimensions preferably lie in practice in the range between 0.1 and 20 mm, particularly preferably in the range from 0.5 mm to 5 mm.

The static mixer according the invention may be advantageously used for various process engineering tasks. For example, a mixture composed of a number of initially separate fluidic components may be produced in it. In this case, the actual mixing section should preferably be preceded by a mixer head, which transforms the components to be mixed into a radially layered annular stream. This embodiment is outlined in FIG. 1a for the case of two different media. The geometrical dimensions (inside and outside diameters) of the annular channel carrying this annular stream at the outlet of the mixer head correspond particularly preferably to those of the annular channel at the inlet of the first mixing stage of the mixing section of the mixer according to the invention. In comparison with most of the known static mixer concepts, the mixer according to the invention thereby also allows a particularly defined simultaneous mixing of more than two fluidic media (see FIG. 1c) on account of the particularly defined repeated division and recombination of the layered incoming stream. This possibility can, for example, be used particularly advantageously whenever three or more reactive fluidic components that form undesired byproducts with each other when respectively mixed in pairs are to be mixed with one another.

In the case where a medium of relatively high viscosity is to be mixed with a medium of significantly lower viscosity, it may also be advantageous to use a mixer according to the invention for three incoming streams, to divide the stream of the medium of lower viscosity into two streams of approximately the same size and to feed these into the mixer with the stream of higher viscosity in such a way as to produce at the beginning of the mixing section an annular stream in which the medium of lower viscosity respectively forms the inner and outer rings, while the medium of higher viscosity flows in the middle ring.

In another case of the use of the mixer according to the invention, the mixture is already in a premixed form. In this case, the mixer head may be configured in a simplified manner and preferably reduces to an inlet connector to the mixing section (see FIG. 1b). Particularly preferably, the core of the mixing section is in this case additionally provided on the inlet side with a cone diffuser, in order to promote a formation with little pressure loss of the annular flow at the inlet of the first mixing stage. The mixer may in this case, i.e. when supplied with a flow of premixed process medium, be advantageously used, for example, for the further homogenization of the mixture. If the components of the mixture in the respectively present state and mixing ratio are soluble in one another, a homogeneous mixture can, as a result of this, be produced in a very short time and with little expenditure of energy. If they are not completely soluble, the mixer can be advantageously used, for example, to produce emulsions, or provisionally maintain them in their structure, since high shearing gradients within the mixing section act on the mixture as a result of the repeated division and deflection of the stream (in particular at relatively high flow rates). In any case, the mass transfer in the mixture, both within homogeneous phases and between immiscible phases, is greatly accelerated during the flow through the mixer according to the invention.

On account of the intensive crossmixing of the stream of mixture as it passes through the static mixer according to the invention, along with the intensified mass transfer there is also a particularly good heat exchange in the mixer between the stream of mixture and the walls of the mixing section. The variation of the number of parallel partial channels within the mixing stages, while the partial channel cross section is kept constant, and consequently a fixed ratio of surface area to volume, thereby provides the possibility for scaling the throughput of the mixer while the heat exchange remains equally good, which is not generally the case when the cross section of the mixing section is used for the scaling of the known static mixers. The mixer is consequently also particularly well suited for controlling the temperature of the mixture during the mixing. Thus, for example, the temperature of the mixture can be specifically maintained while the mixing is increased or reduced, for example in order to set the viscosity of the mixture or of individual components, to influence mass transfer processes, to specifically vary the solubility of individual constituents of the mixture or to control the rate of chemical, physical or biological processes in the mixture.

A temperature-controlled configuration of the mixer can also be used particularly advantageously in particular for carrying out exothermal or endothermal chemical reactions. In this case, one or more stages of the process may proceed within the mixer in succession or partially in parallel and overlapping one another: the forming of the reaction mixture from the reactants, the setting of the reaction temperature (for example to initiate the reaction) and/or the control of the reaction or part thereof under defined and homogeneous conditions in terms of temperature and concentration.

The temperature control of the mixer may be advantageously realized, for example, by channels introduced in or around the outer walls of the mixing section, and possibly in the core thereof, through which a fluidic temperature control medium, as known to a person skilled in the art in the field of heat exchanger technology, flows during operation. Alternatively, electrical heating of the mixer shell (and possibly of the core) is possible, for example by resistance heating elements or by inductive means. Other methods of heating or cooling, such as for example irradiation with infrared light or microwaves, the use of Peltier elements or the flow of exothermically or endothermally reactive mixtures through temperature control channels, may also be advantageous in certain cases of use of the mixer.

All materials that are suitable for the respective application (for example with regard to strength, chemical and thermal resistance, workability, thermal conductivity, thermal expansion, etc.) come into consideration in principle as construction materials for the construction of the mixer according to the invention. In the case of applications with high requirements for the mechanical, thermal and chemical resistance, as often occur in the area of chemical process engineering, corrosion-resistant metals are preferably used, such as for example high-grade steels, nickel-based alloys, titanium (alloys) or refractory metals as well as ceramics (for example aluminum oxide, zirconium oxide, silicon nitride or silicon carbide), fluoropolymers (for example PTFE, PFA, etc.) and fluoroelastomers (for example FFKM, FKM—predominantly as sealing materials). When there are low requirements for the chemical resistance and moderate requirements for the thermal and mechanical stability, the use of less expensive and generally easier-to-work nonferrous metals, such as for example aluminum, copper or brass materials, may also be advantageous. If the requirements for the pressure and temperature stability are even lower, plastics can preferably also be used—including on account of their good workability—for the construction of a mixer according to the invention.

A preferred embodiment of the mixer or its mixing section is made up of a conical or cylindrical core element (20) with channel structures introduced therein, a first arrangement of a number of inner annular elements (21), pushed over this core, arranged one behind the other and provided with substantially axially extending channel structures, and a second arrangement, coaxial thereto, of outer annular elements (22), overlapping in an abutting relationship with the first arrangement and enclosed by a pressure- and fluid-tight, tubular shell (see FIG. 5). The production of the components of this embodiment that definine the mixing section can be realized completely, and particularly advantageously, by machining (for example turning, drilling, milling or grinding) and/or shaping (for example injection-molding, powder injection-molding or precision casting) production methods. In certain cases, additional working by electric discharge machining methods may be advisable or necessary. A further benefit of this embodiment is that the mixer can be completely dismantled, in the sense that all the surfaces in contact with the process fluid can be reversibly made accessible with little effort for inspection and cleaning purposes.

A further preferred embodiment of the mixer or its mixing section is constructed from wedge-shaped cylinder segments, which, when arranged about a common axis, produce a cylinder (possibly also a hollow cylinder). Introduced into the side areas of the cylinder segments are material cuts (depressions), which in the cylindrical assembly of the segments produce a mixing structure according to the invention (FIG. 6). This requires the use of at least two differently structured cylinder segment types, which are used in the assembly in respectively alternating arrangement.

The repeated division and rearrangement of the stream of process fluid—possibly layered on the input side—along the mixing section allows theoretical thicknesses of the individual fluid layers in the range of a few 0.01 mm or even lower to be realized by means of an easily realizable number of mixing stages (for example 5 to 20) up to the mixer output. With an appropriate design, in many cases a mixer according to the invention consequently achieves approximately the capability of a multi-lamination micro mixer with comparable pressure-drop and flow values. In comparison with the latter, however, the static mixer according to the invention has minimum dimensions of the channels flowed through that are easily greater by a factor of 5 to 20, and is consequently much less susceptible to deposits and blockages. Thus, with a static mixer according to the invention, it is also advantageously possible, inter alia, to process media that contain solid or otherwise non-fluid constituents (for example suspensions, slurries, gels, flocculated suspensions, etc.) or in which such non-fluid constituents occur (possibly even temporarily) in the course of the mixing, for example as a result of chemical reactions. Thus, a static mixer according to the invention can, for example, be used particularly advantageously for producing polymers or polymer mixtures, for mixing at least two fluidic media, at least one of which is a suspension, or for producing suspensions by precipitation.

BRIEF DESCRIPTION OF THE DRAWINGS

The invention is explained by way of example on the basis of the following figures, without however being restricted thereto, in which:

FIGS. 2a to f show cross sections of a mixer according to the invention at different positions within a mixing stage, FIGS. 3a to f show cross sections of a mixer according to the invention with an alternative orientation of the partial channels at different positions within a mixing stage, FIGS. 4a to i show cross sections of a mixer according to the invention with a further alternative orientation of the partial channels at different positions within a mixing stage, the azimuthal offset of the partial channels in successive mixing stages taking place in opposite directions, FIGS. 5a and b show a perspective representation of a possible embodiment of the mixing section of a mixer according to the invention (detail) in an assembled form and an exploded form

FIG. 1a) shows the longitudinal section of a static mixer according to the invention in one configuration, as it is preferably used for the mixing of two different fluidic media. The mixing section (2), consisting of a sequence of mixing stages (1) flowed through sequentially, is preceded here by a mixer head (3), which feeds the two media (7a/b) to be mixed, which are supplied separately by means of the inlets (5a/b), into the mixing section in the form of a radially layered annular stream. The mixture (8) leaves the mixer via the outlet segment (4) attached to the output (6) of the mixing section.

FIG. 1b) shows the longitudinal section of a static mixer according to the invention in a further configuration, which can preferably be used for the further mixing or homogenizing of an already premixed product stream (7). This configuration differs from that shown in FIG. 1a substantially by the form of the mixer head, which in this case is provided with only one fluid inlet (5).

FIG. 1c shows the longitudinal section of a static mixer according to the invention in a third configuration, which preferably serves for the mixing of three separate fluid streams. These may be, for example, three different media that are to be processed simultaneously into a uniform mixture. However, such a configuration of the mixer also finds an advantageous use in the mixing of only two different media, for example if these media are supplied in a particularly great mass flow ratio or have greatly differing viscosities. In these cases, it is advantageous to supply the component of the mixture with the greater mass flow or the lower viscosity via the inlets (5b) and (5c) and to feed the other component of the mixture in via the fluid inlet (5a).

FIG. 6 shows a perspective representation of a further possible embodiment of the mixing section of a mixer according to the invention (detail). This is made up of two different types of wedge-shaped cylinder segments, in the side areas of which specific channel structure elements have been introduced. With alternating arrangement of the cylinder segments to form a complete cylinder, the channel structure elements of the individual segments combine to form the mixing structure of a mixing section according to the invention.

LIST OF DESIGNATIONS

Figure 1A:
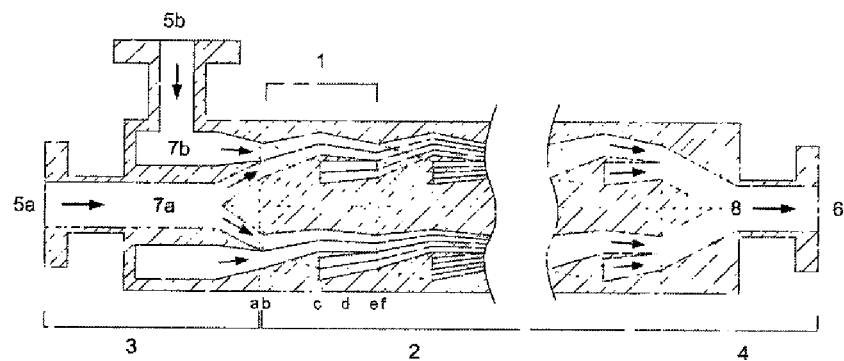
FIGS. 1a to c show in longitudinal section the basic construction of a mixer according to the invention for various numbers of fluidic media to be mixed.
Figure 1B:
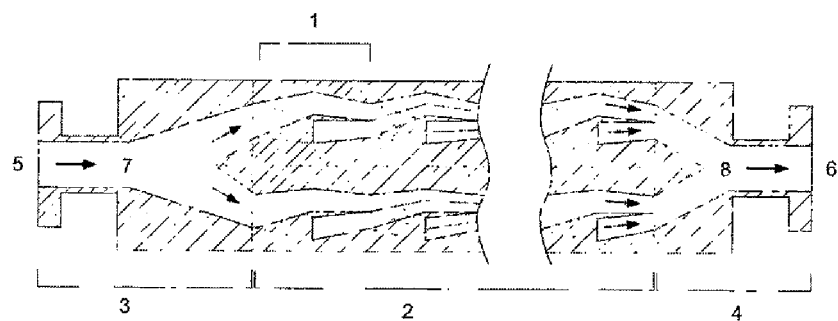
Figure 1C:
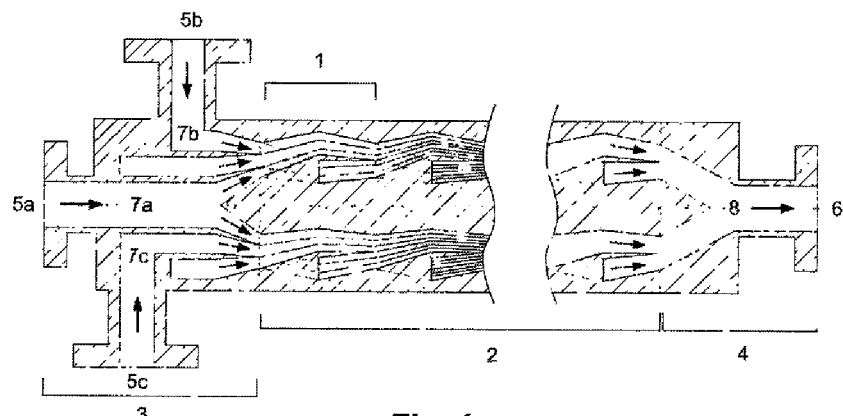
Figure 2:
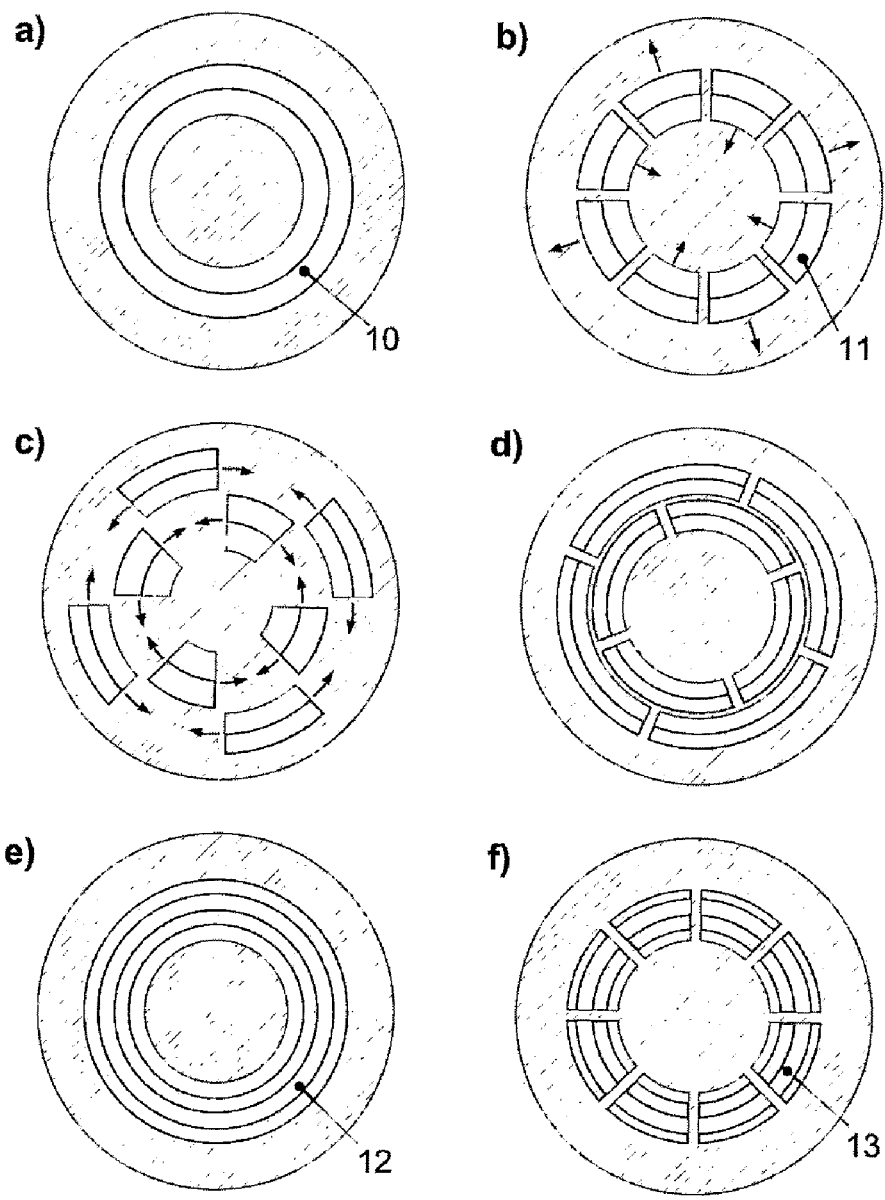
FIG. 2 illustrates how the fluid is carried within a mixing stage of a mixer according to the invention on the basis of a sequence of cross sections following one another in the direction of flow: the stream of mixture enters the mixing stage in the form of an—ideally radially layered—annular flow (10) (FIG. 2a). In the next step, this annular flow goes over into an (even) number of partial channels (11), thus is thereby azimuthally segmented (FIG. 2b). As they continue, the partial channels undergo an alternatingly opposite radial offset (FIG. 2b after FIG. 2c), until neighboring partial channels are no longer overlapping with one another in the radial direction. Subsequently, the partial channels undergo an azimuthal extension, until originally neighboring partial channels again largely overlap one another in the azimuthal direction (FIG. 2c after 2d). As an intermediate stage, in the transition into the following mixing stage, once again an unsegmented annular flow may be achieved (FIG. 2e) or the partial segmentation after the azimuthal extension (FIG. 2d) goes over preferably directly into the partial channel arrangement of the following mixing stage (FIG. 2f-then rotated by 1/16 of a turn). In most applications, the azimuthal extension of the partial channels, which represents the transition of the radially offset partial channels into a (possibly segmented) annular flow (FIG. 2c after 2d), is preferably made to coincide with a simultaneous radial compression of the partial channels, in order to keep the overall flow cross section approximately constant along the mixing stage and to keep the dimensions of the annular channel the same at the transition of the mixing stages in the case of all the mixing stages (or at least a number of successive mixing stages).
Figure 3:
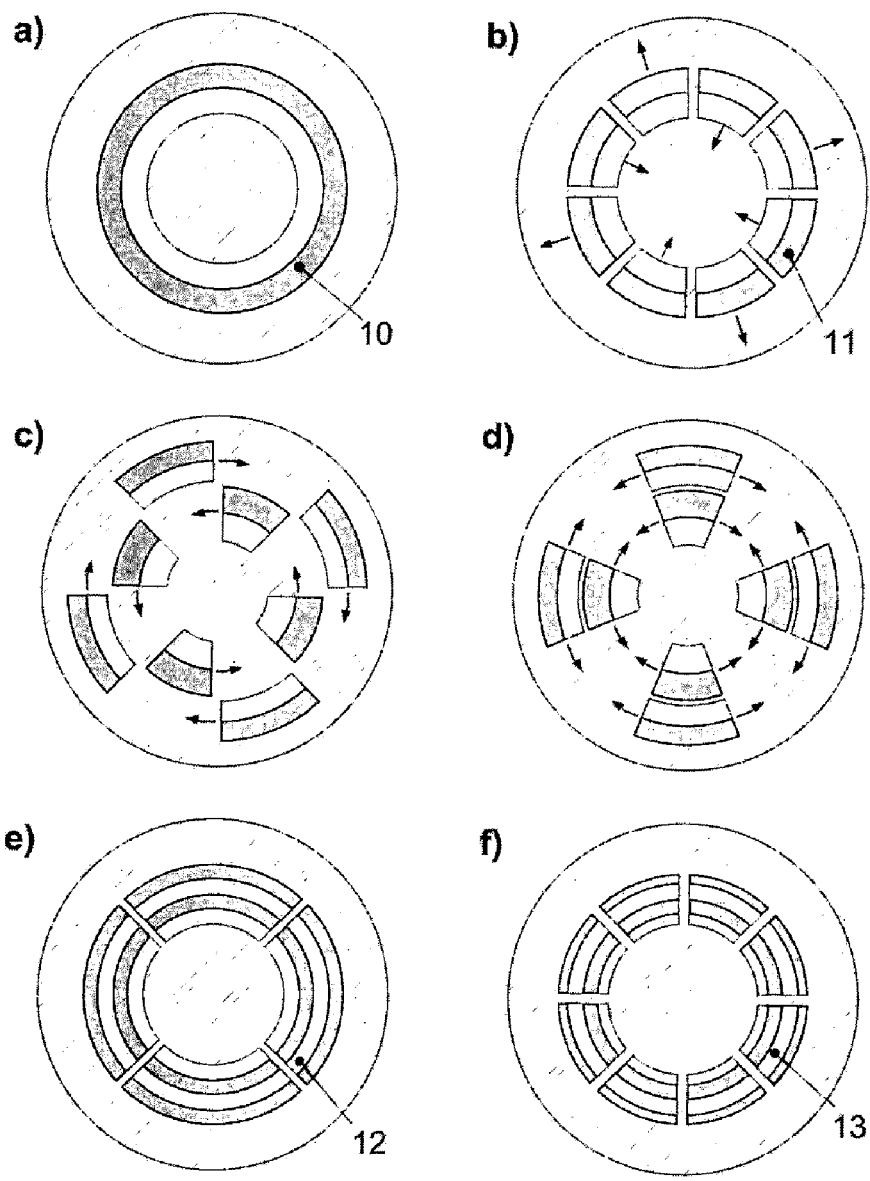
In FIG. 3, an alternative way of carrying the fluid within a mixing stage of a mixer according to the invention is represented on the basis of a sequence of cross sections following one another in the direction of flow. Once again, first there is an azimuthal segmentation of the entering annular stream and an alternating radial offset of the partial channels thus produced (FIGS. 3a and b). Subsequently, however, respectively neighboring partial channels are offset in opposite azimuthal directions such that they at least almost completely overlap azimuthally (FIG. 2c). Following this offset, or alternatively also in parallel therewith, the partial channels are extended so far in the azimuthal direction that, toward the end of the mixing stage, a (possibly segmented) annular flow is again achieved (FIGS. 2d to f).
Figure 4:
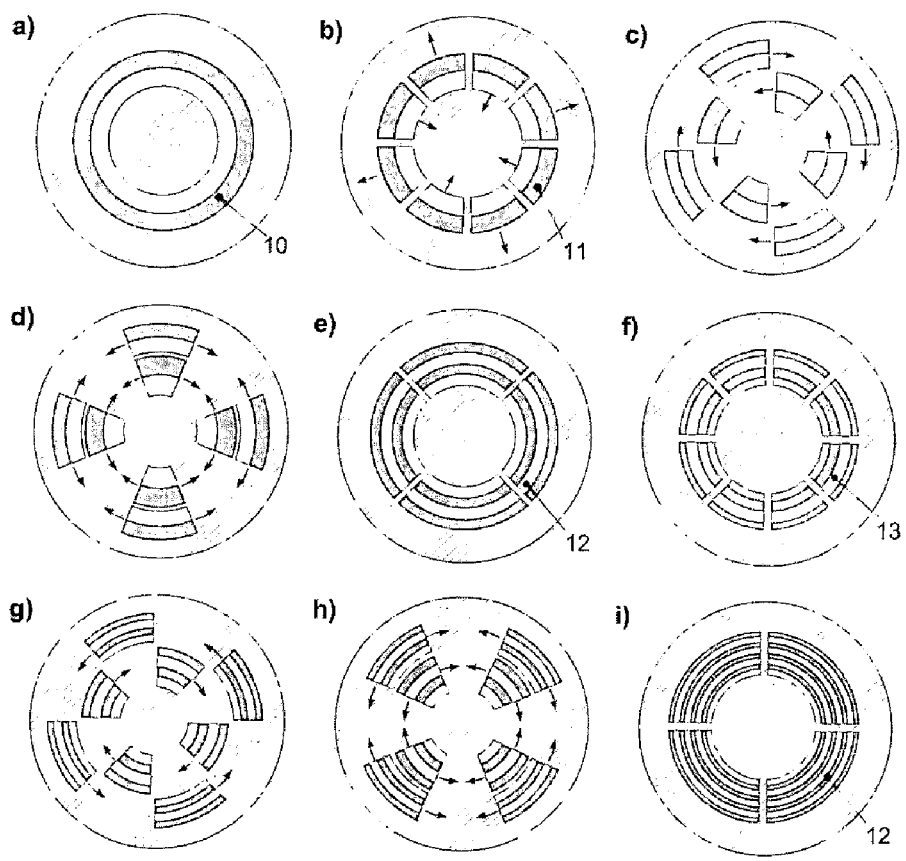
FIG. 4 illustrates substantially the same way of carrying fluid within a mixing stage of a mixer according to the invention, but additionally also shows the sequence of the partial channel profiles in the mixing stage following thereafter (FIGS. 4f to i). In particular, in this following mixing stage, the azimuthal offset of neighboring partial channels that are radially displaced with respect to one another takes place in the opposite direction to the previous mixing stage. This form of carrying the fluid, in which the direction of the azimuthal offset within successive mixing stages respectively alternates, is particularly preferred, since, as a result of this, particularly good crossmixing between the partial channels takes place along the mixing section.
Figure 5A:
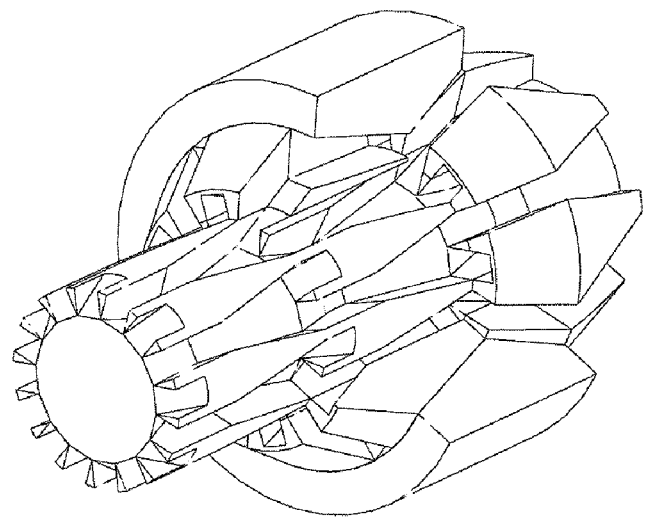
FIG. 5 shows a possible embodiment of the mixing section (detail) of a mixer according to the invention. This is made up of a cylindrical core (20), provided on its outer area with channel structures, and inner (21) and outer (22) annular segments pushed alternately thereover, which segments in combination realize the desired way in which the partial channel is oriented (in the example shown, that outlined in FIG. 2).
Figure 5B:
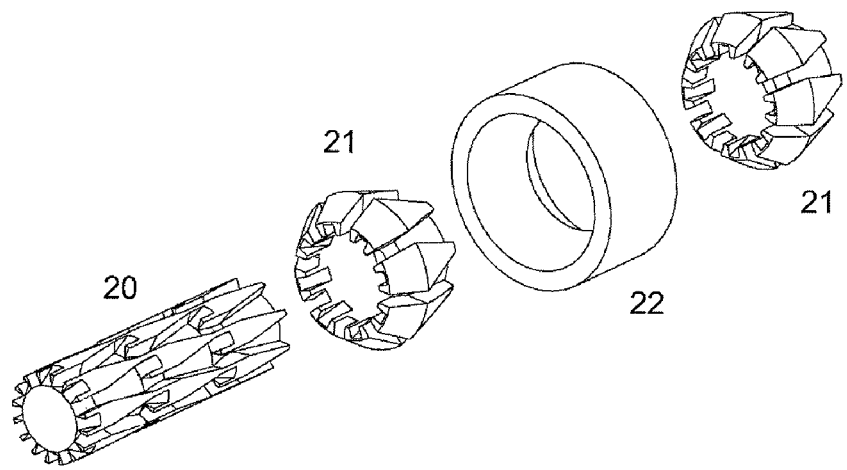
Figure 6:
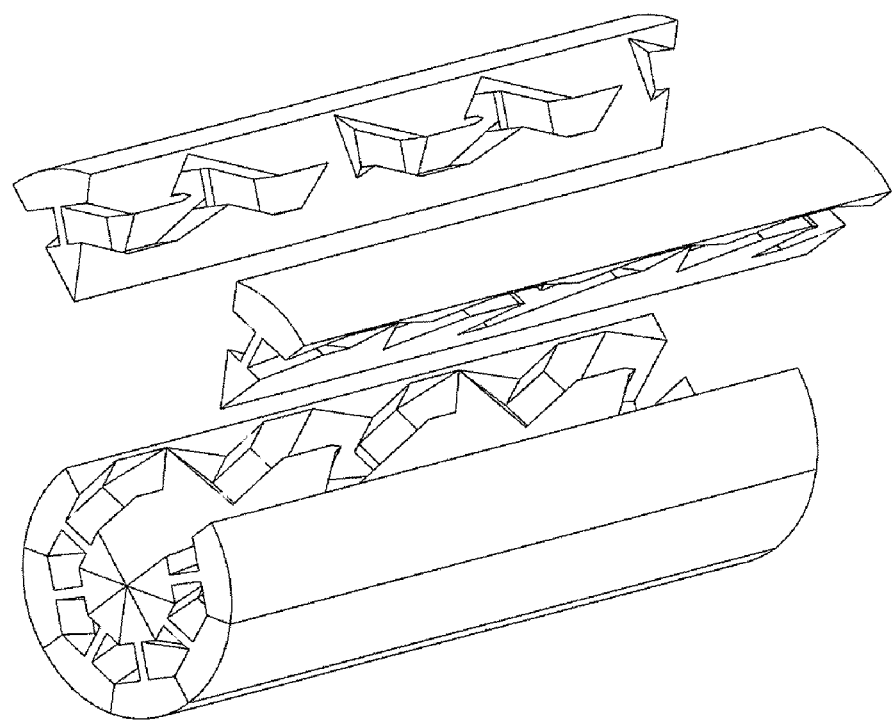
FIG. 6 shows a perspective representation of a further possible embodiment of the mixing section of a mixer according to the invention (detail) in a partially exploded form.
Figure 7:
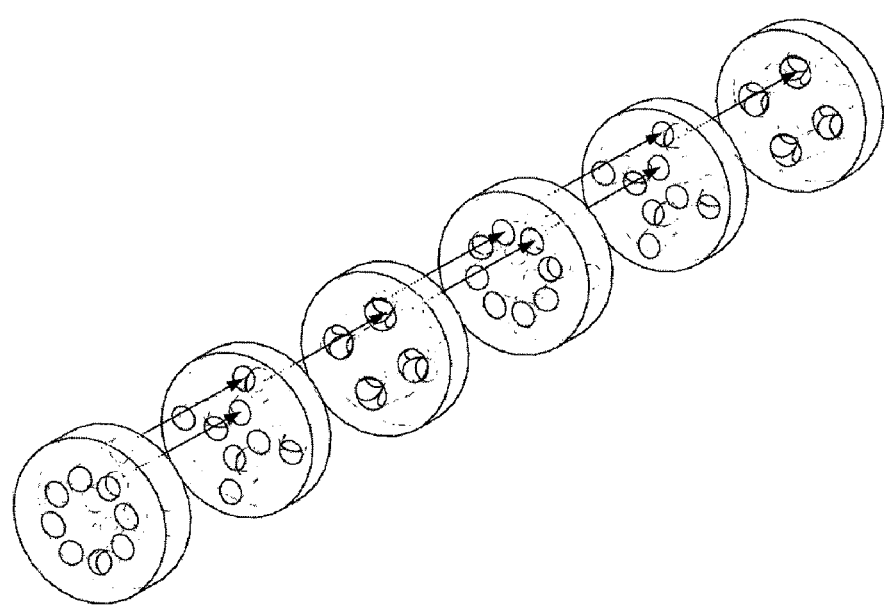
In FIG. 7, a further possible embodiment of a mixing stage of the mixing section of a mixer according to the invention is represented. Here, the partial channels have been machined portion by portion into different, preferably round, disks as continuous openings or bores. By stacking the disks in an aligned manner, the openings or bores form a contiguous system of channels of a mixing section according to the invention. For use, the stack of disks is pushed into a suitable, for example tubular, housing (not shown here), which possibly contains a mixer head and an outlet segment for the supply and discharge of the process fluids.

1. Mixing stage
2. Mixing section
3. Mixer head
4. Outlet segment
5. Inlet for premixture
5a,5b,5c. Inlets for components of the mixture
6. Mixer outlet
7. Premixture
7a,7b,7c. Components of the mixture (media to be mixed)
8. Mixture
10. Annular channel at the inlet to the mixing stage
11. Partial channel
12. (Unsegmented or partially segmented) annular channel at the outlet of the mixing stage/inlet to the following mixing stage
13. Segmented annular channel (at the inlet to the following mixing stage)
20. Core element
21. Inner annular element 22. Outer annular element

I claim:

1. A static mixer, comprising a coaxial arrangement of at least two sequential mixing stages, each of which contains a first annular channel which said first annular channels transition into an even number of partial channels of approximately the same size, which initially go through an alternating radial offset until neighboring partial channels no longer radially overlap, and are then transformed by azimuthal displacement and/or widening into radially interleaved, annular channels, which finally run together again at the end of the mixing stage, by radial fusion, to a second annular channel.

2. The static mixer as claimed in claim 1, wherein the first mixing stage is preceded by a device for feeding in at least two fluidic media, which transforms said at least two media to be fed in into a radially layered annular stream and introduces said at least two media into the first annular channel of the first of said at least two sequential mixing stages.

3. The static mixer as claimed in claim 1, wherein the transformation of the radially alternating partial channels into annular channels takes place exclusively by azimuthal widening.

4. The static mixer as claimed in claim 1, wherein the transformation of the radially alternating partial channels into segmented annular channels takes place by initial azimuthal displacement and subsequent azimuthal widening.

5. The static mixer as claimed in claim 1, wherein said first annular channels are azimuthally segmented into an even number of partial channels at the inlet and outlet of each mixing stage and the segmentation is continued in the respectively following mixing stage without steps.

6. The static mixer as claimed in claim 1, wherein the number of mixing stages corresponds to 0.3 to 0.7 of the number of partial channels within a mixing stage.

7. The static mixer as claimed in claim 1, wherein the hydraulic diameter of the partial channels in the mixing stages is not greater than 2 mm.

8. The static mixer as claimed in claim 1, wherein the static mixer is equipped with a device for controlling the temperature of the media flowing through.

9. The static mixer as claimed in claim 1, wherein the mixing stages thereof is made up of a conical or cylindrical core element with channel structures introduced therein, a number of annular elements overlapping one another, pushed over this core, some with substantially axially extending channel structures, and an enclosure pressure- and fluid-tight, annular shell.

10. The static mixer as claimed in claim 1, wherein the mixing stages thereof is made up of an even number of wedge-shaped cylinder segments, in side areas of which channel structure portions which in the assembled state produce said arranged and sequence of mixing channels according the invention are present.

11. A method for producing polymer mixtures which comprises mixing polymers in the static mixer of claim 1.

12. A method for mixing at least two fluidic media, at least one of which is a suspension, which comprises, mixing said fluidic media in the static mixer of claim 1.

13. The static mixer of claim 1, wherein said annular channels contained by each of said sequential mixing stages are azimuthally segmented.

14. The static mixer of claim 1, wherein said radially interleaved annular channels are azimuthally segmented.

15. The static mixer of claim 1, wherein said annular channel at the end of the mixing stage is azimuthally segmented.

* * * * *